(12) United States Patent
DiPietro et al.

(10) Patent No.: US 7,939,620 B2
(45) Date of Patent: May 10, 2011

(54) HIGH DENSITY DATA STORAGE MEDIUM, METHOD AND DEVICE

(75) Inventors: Richard Anthony DiPietro, Campbell, CA (US); Urs T. Duerig, Rueschlikon (CN); Jane Elizabeth Frommer, San Jose, CA (US); Bernd Walter Gotsmann, Horgan (CN); Erik Christopher Hagberg, Evansville, IN (US); James Lupton Hedrick, Pleasanton, CA (US); Armin W. Knoll, Adliswil (CN); Teddie Peregrino Magbitang, San Jose, CA (US); Robert Dennis Miller, San Jose, CA (US); Russell Clayton Pratt, Los Gatos, CA (US); Charles Gordon Wade, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 12/056,477

(22) Filed: Mar. 27, 2008

(65) Prior Publication Data

US 2008/0175134 A1    Jul. 24, 2008

Related U.S. Application Data

(63) Continuation of application No. 11/618,945, filed on Jan. 2, 2007, now Pat. No. 7,558,186.

(51) Int. Cl.
| | |
|---|---|
| C08G 8/26 | (2006.01) |
| C08G 8/02 | (2006.01) |
| C08G 14/00 | (2006.01) |
| C08G 63/00 | (2006.01) |
| B28B 11/08 | (2006.01) |
| B29C 59/00 | (2006.01) |

(52) U.S. Cl. ......... 528/127; 528/125; 528/171; 264/293
(58) Field of Classification Search ................... 528/125, 528/127, 171; 264/293
See application file for complete search history.

(56) References Cited

U.S. PATENT DOCUMENTS

| | | | |
|---|---|---|---|
| 4,510,296 | A | 4/1985 | Hergenrother |
| 4,513,131 | A | 4/1985 | Reinhardt et al. |
| 4,667,010 | A | 5/1987 | Eldin |
| RE33,079 | E | 10/1989 | Bilow et al. |
| 5,268,444 | A | 12/1993 | Jensen et al. |
| 5,290,908 | A | 3/1994 | D'Alelio |

(Continued)

FOREIGN PATENT DOCUMENTS
EP    05405018.2    1/2005

OTHER PUBLICATIONS

Godt et al. (Chem Euro J 2000, 6(19), 3522).*

(Continued)

*Primary Examiner* — Mark Eashoo
*Assistant Examiner* — Liam J Heincer
(74) *Attorney, Agent, or Firm* — Schmeiser, Olsen & Watts

(57) ABSTRACT

A composition of matter for the recording medium of nanometer scale thermo-mechanical information storage devices and a nanometer scale thermo-mechanical information storage device. The composition includes: one or more polyaryletherketone polymers, each of the one or more polyaryletherketone polymers having two terminal ends, each terminal end having two or more phenylethynyl moieties. The one or more polyaryletherketone polymers are thermally cured and the resulting cross-linked polyaryletherketone resin used as the recording layers in atomic force data storage devices.

22 Claims, 4 Drawing Sheets

U.S. PATENT DOCUMENTS

| | | | |
|---|---|---|---|
| 5,374,701 | A | 12/1994 | Hay et al. |
| 5,382,463 | A | 1/1995 | Adkins et al. |
| 5,412,065 | A | 5/1995 | Amone et al. |
| 5,446,204 | A | 8/1995 | Bryant et al. |
| 5,537,372 | A | 7/1996 | Albrecht et al. |
| 5,606,014 | A | 2/1997 | Connell et al. |
| 5,689,004 | A | 11/1997 | Connell et al. |
| 5,761,809 | A | 6/1998 | Fuller et al. |
| 5,864,050 | A | 1/1999 | Taguchi et al. |
| 5,965,679 | A | 10/1999 | Godschalx et al. |
| 5,965,687 | A | 10/1999 | Jensen |
| 6,017,618 | A | 1/2000 | Gupta et al. |
| 6,124,421 | A | 9/2000 | Lau et al. |
| 6,172,128 | B1 | 1/2001 | Lau et al. |
| 6,252,001 | B1 | 6/2001 | Babb et al. |
| 6,260,949 | B1 | 7/2001 | Smith et al. |
| 6,288,188 | B1 | 9/2001 | Godschalx et al. |
| 6,303,733 | B1 | 10/2001 | Lau et al. |
| 6,344,523 | B1 | 2/2002 | Hawthorne et al. |
| 6,380,347 | B1 | 4/2002 | Lau et al. |
| 6,395,907 | B1 | 5/2002 | Wright et al. |
| 6,423,811 | B1 | 7/2002 | Lau et al. |
| 6,518,392 | B2 | 2/2003 | Carter et al. |
| 6,660,820 | B1 | 12/2003 | Martin et al. |
| 6,713,590 | B2 | 3/2004 | Lau et al. |
| 6,803,441 | B2 | 10/2004 | Lau et al. |
| 6,911,519 | B2 | 6/2005 | Scola et al. |
| 6,987,147 | B2 | 1/2006 | Lau et al. |
| 7,291,692 | B2 | 11/2007 | Higashimura et al. |
| 2002/0086968 | A1 | 7/2002 | Haussmann et al. |
| 2003/0118940 | A1 | 6/2003 | Narang et al. |
| 2004/0067284 | A1 | 4/2004 | Sankey et al. |
| 2004/0158024 | A1 | 8/2004 | Li et al. |
| 2005/0018587 | A1 | 1/2005 | Petrin |
| 2005/0037560 | A1 | 2/2005 | Duerig et al. |
| 2005/0047307 | A1 | 3/2005 | Frommer et al. |
| 2005/0050258 | A1 | 3/2005 | Frommer et al. |
| 2005/0096452 | A1 | 5/2005 | Higashimura et al. |
| 2005/0154077 | A1 | 7/2005 | Narang et al. |
| 2007/0252138 | A1 | 11/2007 | Li et al. |
| 2007/0286996 | A1 | 12/2007 | Gotsmann et al. |
| 2007/0296101 | A1 | 12/2007 | DiPietro et al. |
| 2008/0159114 | A1 | 7/2008 | DiPietro et al. |
| 2008/0205253 | A1 | 8/2008 | DiPietro et al. |

OTHER PUBLICATIONS

Connell et al. J.M.S.—Rev. Macromol. Chem. Phys., C40(2&3), 207-230 (2000).*

Vettiger et al.; The "Millipede"—More than one thousand tips for future AFM data storage; IBM Journal of Research and Development; vol. 44, No. 3; May 2000; pp. 323-340.

Vettiger et al.; The "Millipede"—Nanotechnology Entering Data Storage; IEEE Transactions on Nanotechnology; vol. 1, No. 1; Mar. 2002; pp. 39-55.

Office Action (Mail Date Sep. 28, 2009) for U.S. Appl. No. 12/051,128, filed Mar. 19, 2008, First Named Inventor: Richard Anthony DiPietro; Confirmation No. 9975.

* cited by examiner

HIGH DENSITY DATA STORAGE MEDIUM, METHOD AND DEVICE

This application is a continuation of copending U.S. patent application Ser. No. 11/618,945 filed on Jan. 2, 2007.

FIELD OF THE INVENTION

The present invention relates to the field of high-density data storage and read-back and more specifically to a data storage and read-back medium, a data storage and read-back system, and a data storage and read-back method.

BACKGROUND OF THE INVENTION

Current data storage and imaging methodologies operate in the micron regime. In an effort to store ever more information in ever-smaller spaces, data storage density has been increasing. In an effort to reduce power consumption and increase the speed of operation of integrated circuits, the lithography used to fabricate integrated circuits is pressed toward smaller dimensions and denser imaging. As data storage size increases and density increases and integrated circuit densities increase, there is a developing need for compositions of matter for the storage media that operate in the nanometer regime.

SUMMARY OF THE INVENTION

A first aspect of the present invention is a composition of matter, comprising: one or more polyaryletherketone polymers, each of the one or more polyaryletherketone polymers having two terminal ends, each terminal end having two or more phenylethynyl moieties.

A second aspect of the present invention is a method, comprising: forming a layer of the one or more polyaryletherketone polymers of the first aspect on a substrate; thermally curing the one or more polyaryletherketone polymers of the first aspect to form a polyaryletherketone resin, the polyaryletherketone resin cross-linked by cyclo-addition reactions of the phenylethynyl moieties; heating and bringing a thermo-mechanical device into contact with the polyaryletherketone resin to write information into the polyaryletherketone resin; bringing the thermo-mechanical device, when unheated, into proximity to the polyaryletherketone resin to read information stored in the polyaryletherketone resin; and heating and bringing the thermo-mechanical device into proximity with the polyaryletherketone resin to erase information from the polyaryletherketone resin.

A third aspect of the present invention is a method, comprising: forming a layer of polyaryletherketone resin on a substrate by thermally curing one or more polyaryletherketone polymers, each of the one or more polyaryletherketone polymers having two terminal ends, each terminal end having two or more phenylethynyl moieties, and bringing a thermal-mechanical probe heated to a temperature of greater than about 100° C. into proximity with the layer of a polyaryletherketone resin multiple times to induce deformed regions at points in the layer of the polyaryletherketone resin, thereby writing information in the layer of the resin.

A fourth aspect of the present invention is a data storage device, comprising: a recording medium comprising a layer of polyaryletherketone resin overlying a substrate, in which topographical states of the layer of the polyaryletherketone resin represent data, the polyaryletherketone resin comprising thermally cured one or more polyaryletherketone polymers, each of the one or more polyaryletherketone polymers having two terminal ends, each terminal end having two or more phenylethynyl moieties; a read-write head having one or more thermo-mechanical probes, each of the one or more thermo-mechanical probes including a resistive region for locally heating a tip of the thermo-mechanical probe in response to electrical current being applied to the one or more thermo-mechanical probes; and a scanning system for scanning the read-write head across a surface of the recording medium.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Figure 1A:
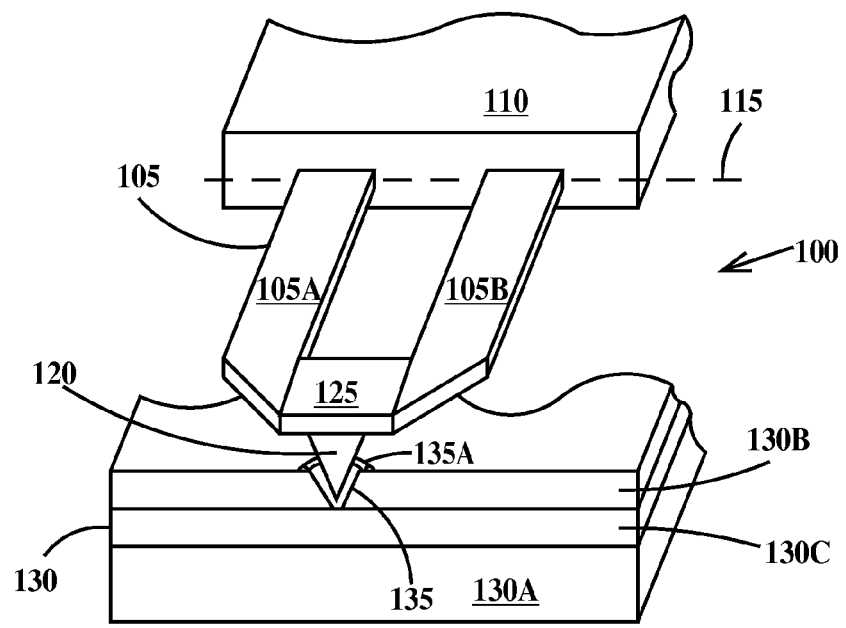
FIGS. 1A through 1C illustrate the structure and operation of a tip assembly for a data storage device including the data storage medium according to the embodiments of the present invention.
Figure 1B:
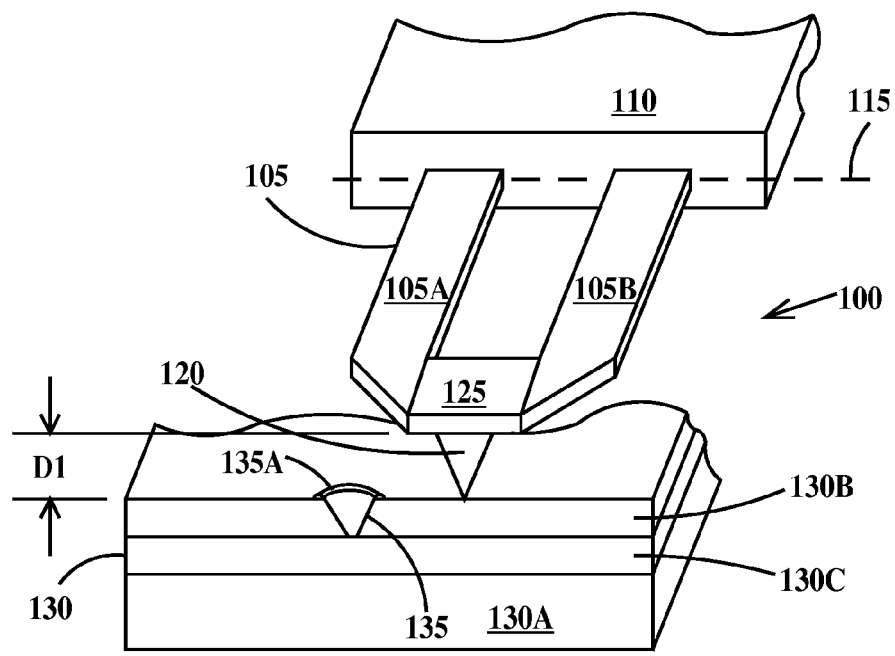
Figure 1C:
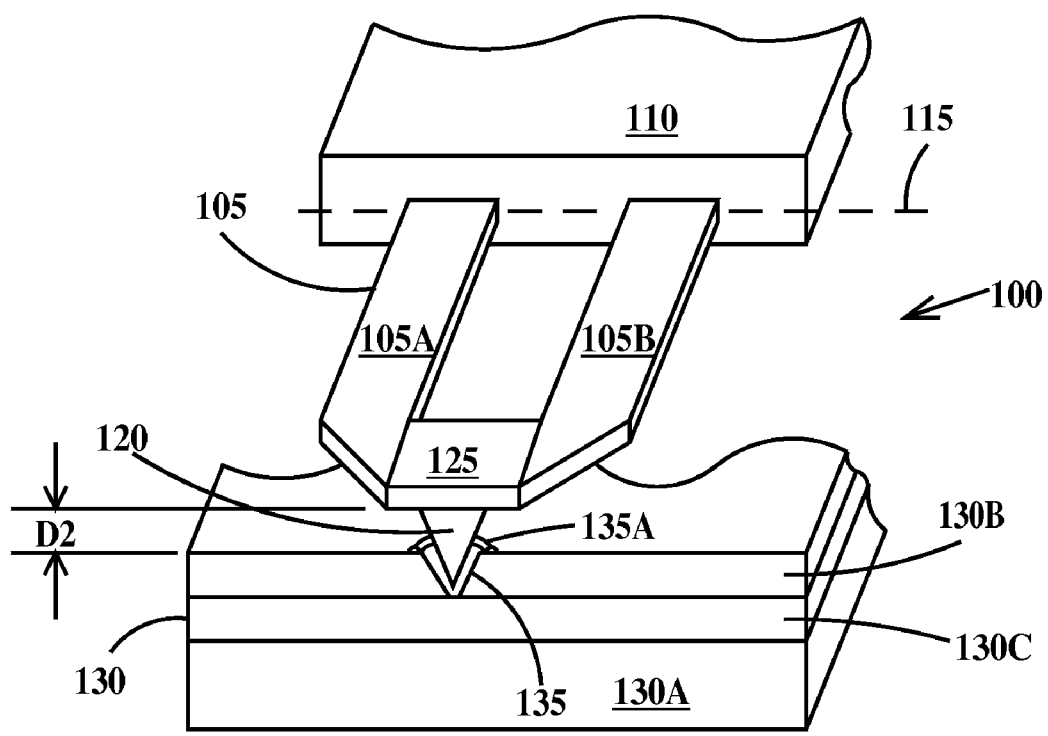

FIGS. 1A through 1C illustrate the structure and operation of a tip assembly 100 for a data storage device including the data storage medium according to the embodiments of the present invention. In FIG. 1A, probe tip assembly 100 includes a U-shaped cantilever 105 having flexible members 105A and 105B connected to a support structure 110. Flexing of members 105A and 105B provides for substantial pivotal motion of cantilever 105 about a pivot axis 115. Cantilever 105 includes an indenter tip 120 fixed to a heater 125 connected between flexing members 105A and 105B. Flexing members 105A and 105B and heater 125 are electrically conductive and connected to wires (not shown) in support structure 110. In one example, flexing members 105A and 105B and indenter tip 120 are formed of highly-doped silicon and have a low electrical resistance, and heater 125 is formed of lightly doped silicon having a high electrical resistance sufficient to heat indenter tip 120, in one example, to between about 100° C. and about 500° C. when current is passed through heater 125. The electrical resistance of heater 125 is a function of temperature.

Also illustrated in FIG. 1A is a storage medium (or a recording medium) 130 comprising a substrate 130A, and a cured polyaryletherketone resin layer 130B. In one example, substrate 130A comprises silicon. Cured polyaryletherketone resin layer 130B may be formed by solution coating, spin coating, dip coating or meniscus coating polyaryletherketone polymer and reactive diluent formulations and performing a curing operation on the resultant coating. In one example, cured polyaryletherketone resin layer 130B has a thickness between about 10 nm and about 500 nm. The composition of cured polyaryletherketone resin layer 130B is described infra. An optional penetration stop layer 130C is shown between cured polyaryletherketone resin layer 130B and substrate 130A. Penetration stop layer 130C limits the depth of penetration of indenter tip 120 into cured polyaryletherketone resin layer 130B.

Turning to the operation of tip assembly 100, in FIG. 1A, an indentation 135 is formed in cured polyaryletherketone resin layer 130B by heating indenter tip 120 to a writing temperature $T_W$ by passing a current through cantilever 105 and pressing indenter tip 120 into cured polyaryletherketone resin layer 130B. Heating indenter tip 120 allows the tip to penetrate the cured polyaryletherketone resin layer 130B forming indentation 135, which remains after the tip is removed. In a first example, the cured polyaryletherketone resin layer 130B is heated by heated indenter tip 120, the temperature of the indenter tip being not greater than about 500° C., to form indentation 135. In a second example, the cured polyaryletherketone resin layer 130B is heated by heated indenter tip 120, the temperature of the indenter tip being not greater than about 400° C., to form indentation 135. In a third example, the cured polyaryletherketone resin layer 130B is heated by heated indenter tip 120, the temperature of the indenter tip being between about 200° C. and about 500° C., to form indentation 135. In a fourth example, the cured polyaryletherketone resin layer 130B is heated by heated indenter tip 120, the temperature of the indenter tip being between about 100° C. and about 400° C., to form indentation 135. As indentations 135 are formed, a ring 135A of cured polyaryletherketone resin is formed around the indentation. Indentation 135 represents a data bit value of "1", a data bit value of "0" being represented by an absence of an indentation. Indentations 135 are nano-scale indentations (several to several hundred nanometers in width).

FIGS. 1B and 1C illustrate reading the bit value. In FIGS. 1B and 1C, tip assembly 100 is scanned across a portion of cured polyaryletherketone resin layer 130B. When indenter tip 120 is over a region of cured polyaryletherketone resin layer 130B not containing an indentation, heater 125 is a distance D1 from the surface of the cured polyaryletherketone resin layer (see FIG. 1B). When indenter tip 120 is over a region of cured polyaryletherketone resin layer 130B containing an indentation, heater 125 is a distance D2 from the surface of the cured polyaryletherketone resin layer (see FIG. 1C) because the tip "falls" into the indentation. D1 is greater than D2. If heater 125 is at a temperature $T_R$ (read temperature), which is lower than $T_W$ (write temperature), there is more heat loss to substrate 130A when indenter tip 120 is in an indentation than when the tip is not. This can be measured as a change in resistance of the heater at constant current, thus "reading" the data bit value. It is advantageous to use a separate heater for reading, which is mechanically coupled to the tip but thermally isolated from the tip. A typical embodiment is disclosed in Patent Application EP 05405018.2, 13 Jan. 2005.

"Erasing" (not shown) is accomplished by positioning indenter tip 120 in close proximity to indentation 135, heating the tip to a temperature $T_E$ (erase temperature), and applying a loading force similar to writing, which causes the previously written indent to relax to a flat state whereas a new indent is written slightly displaced with respect to the erased indent. The cycle is repeated as needed for erasing a stream of bits whereby an indent always remains at the end of the erase track. $T_E$ is typically greater than $T_W$. The erase pitch is typically on the order of the rim radius. In a first example, the cured polyaryletherketone resin layer 130B is heated by heated indenter tip 120, the temperature of the indenter tip is not greater than about 500° C., and the erase pitch is 10 nm to eliminate indentation 135. In a second example, the cured polyaryletherketone resin layer 130B is heated by heated indenter tip 120, the temperature of the indenter tip is not greater than about 400° C., and the erase pitch is 10 nm to eliminate indentation 135. In a third example, the cured polyaryletherketone resin layer 130B is heated by heated indenter tip 120, the temperature of the indenter tip is between about 200° C. and about 400° C., and the erase pitch is 10 nm to eliminate indentation 135. In a fourth example, the cured polyaryletherketone resin layer 130B is heated by heated indenter tip 120, the temperature of the indenter tip is between about 200° C. and about 500° C., and the erase pitch is 10 nm to eliminate indentation 135.

Figure 2:
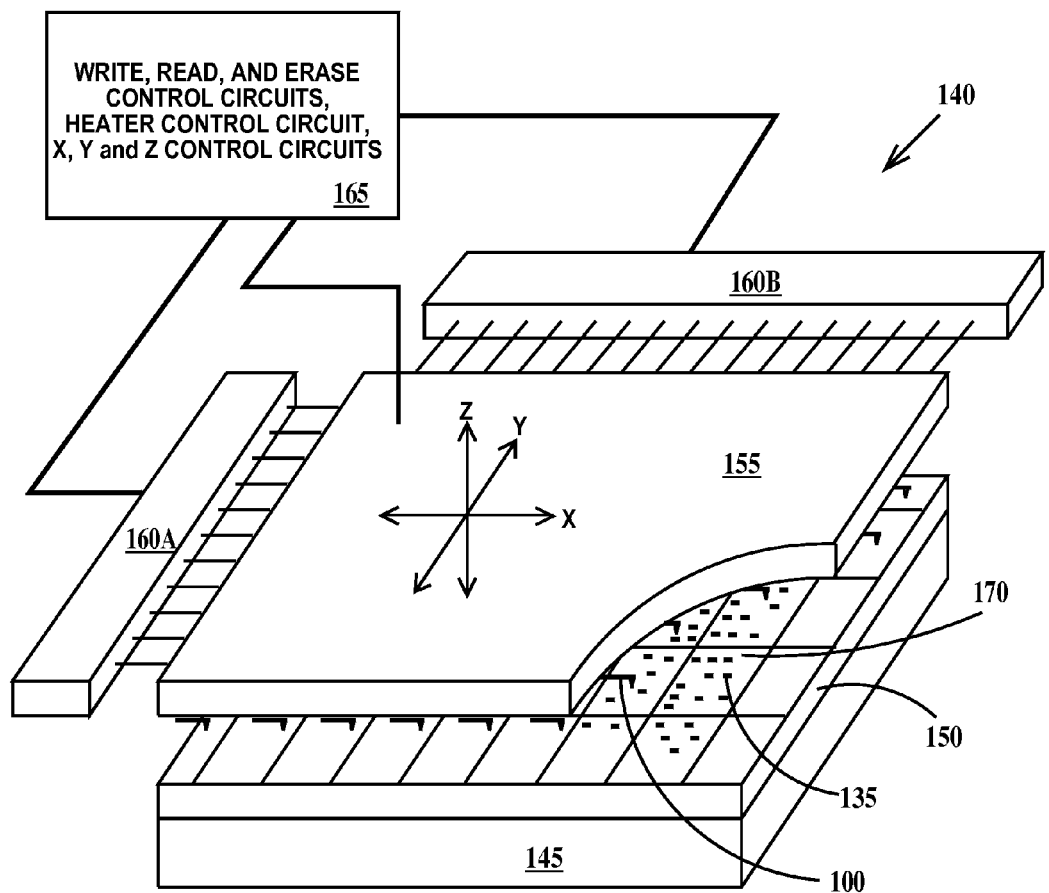
FIG. 2 is an isometric view of a local probe storage array including the data storage medium according to the embodiments of the present invention.

FIG. 2 is an isometric view of a local probe storage array 140 including the data storage medium according to the embodiments of the present invention. In FIG. 2, local probe storage array 140 includes substrate 145 having a cured polyaryletherketone resin layer 150 (similar to cured polyaryletherketone resin layer 130B of FIGS. 1A, 1B and 1C), which acts as the data-recording layer. An optional tip penetration stop layer may be formed between cured polyaryletherketone resin layer 150 and substrate 145. In one example, substrate 145 comprises silicon. Cured polyaryletherketone resin layer 150 may be formed by solution coating, spin coating, dip coating or meniscus coating uncured polyaryletherketone resin formulations and performing a curing operation on the resultant coating. In one example, cured polyaryletherketone resin layer 150 has a thickness between about 10 nm and about 500 nm and a root mean square surface roughness across a writeable region of cured polyaryletherketone resin layer 150 of less than about 1.0 nm across the cured polyaryletherketone resin layer. The composition of cured polyaryletherketone resin layer 150 is described infra. Positioned over cured polyaryletherketone resin layer 150 is a probe assembly 155 including an array of probe tip assemblies 100 (described supra). Probe assembly 155 may be moved in the X, Y and Z directions relative to substrate 145 and cured polyaryletherketone resin layer 150 by any number of devices as is known in the art. Switching arrays 160A and 160B are connected to respective rows (X-direction) and columns (Y-direction) of probe tip assemblies 100 in order to allow addressing of individual probe tip assemblies. Switching arrays 160A and 160B are connected to a controller 165 which includes a write control circuit for independently writing data bits with each probe tip assembly 100, a read control circuit for independently reading data bits with each probe tip assembly 100, an erase control circuit for independently erasing data bits with each probe tip assembly 100, a heat control circuit for independently controlling each heater of each of the probe tip assembles 100, and X, Y and Z control circuits for controlling the X, Y and Z movement of probe assembly 155. The Z control circuit controls a contact mechanism (not shown) for contacting the cured polyaryletherketone resin layer 150 with the tips of the array of probe tip assemblies 100.

During a write operation, probe assembly 155 is brought into proximity to cured polyaryletherketone resin layer 150 and probe tip assemblies 100 are scanned relative to the cured polyaryletherketone resin layer. Local indentations 135 are formed as described supra. Each of the probe tip assemblies 100 writes only in a corresponding region 170 of cured polyaryletherketone resin layer 150. This reduces the amount of travel and thus time required for writing data.

During a read operation, probe assembly 155 is brought into proximity to cured polyaryletherketone resin layer 150 and probe tip assemblies 100 are scanned relative to the cured polyaryletherketone resin layer. Local indentations 135 are detected as described supra. Each of the probe tip assemblies 100 reads only in a corresponding region 170 of cured polyaryletherketone resin layer 150. This reduces the amount of travel and thus the time required for reading data.

During an erase operation, probe assembly 155 is brought into proximity to cured polyaryletherketone resin layer 150, and probe tip assemblies 100 are scanned relative to the cured polyaryletherketone resin layer. Local indentations 135 are erased as described supra. Each of the probe tip assemblies 100 reads only in a corresponding region 170 of cured polyaryletherketone resin layer 150. This reduces the amount of travel and thus time required for erasing data.

Additional details relating to data storage devices described supra may be found in the articles "*The Millipede-More than one thousand tips for future AFM data storage*," P. Vettiger et al., *IBM Journal of Research and Development*. Vol. 44 No. 3, May 2000 and "*The Millipede-Nanotechnology Entering Data Storage*," P. Vettiger et al., *IEEE Transaction on Nanotechnology*, Vol. 1, No, 1, March 2002. See also United States Patent Publication 2005/0047307, Published Mar. 3, 2005 to Frommer et al. and United States Patent Publication 2005/0050258, Published Mar. 3, 2005 to Frommer et al., both of which are hereby included by reference in their entireties.

Turning to the composition of cured polyaryletherketone resin layer 130B of FIGS. 1A through 1C, it should be understood that for the purposes of the present invention curing a polymer implies cross-linking the polymer to form a cross-linked polymer or resin.

The polyaryletherketone resin medium or imaging layer of the embodiments of the present invention advantageously meets certain criteria. These criteria include high thermal stability to withstand millions of write and erase events, low wear properties (little or no pickup of material by tips), low abrasion (tips do not easily wear out), low viscosity for writing, glassy character with no secondary relaxations for long data bit lifetime, and shape memory for erasability.

Cured polyaryletherketone resins according to embodiments of the present invention have high temperature stability while maintaining a low glass transition temperature (Tg). In a first example, cured polyaryletherketone resins according to embodiments of the present invention have a Tg of less than about 180° C. In a second example, cured polyaryletherketone resins according to embodiments of the present invention have a Tg of between about 100° C. and about 180° C.

The glass transition temperature should be adjusted for good write performance. To optimize the efficiency of the write process there should be a sharp transition from the glassy state to the rubbery state. A sharp transition allows the cured resin to flow easily when a hot tip is brought into contact and quickly return to the glassy state once the hot tip is removed. However, too high a $T_g$ leads to high write currents and damage to the probe tip assemblies described supra.

A formulation of polyaryletherketone polymer according to embodiments of the present invention comprises one or more polyaryletherketone polymers. Each of the polyaryletherketone polymers has the structure:

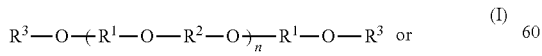

(I)

or

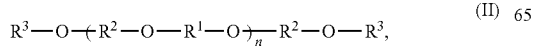

(II)

wherein $R^1$ is selected from the group consisting of:

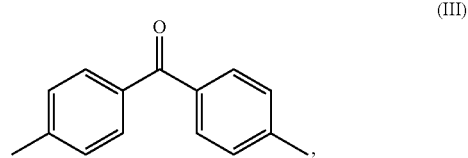

(III)

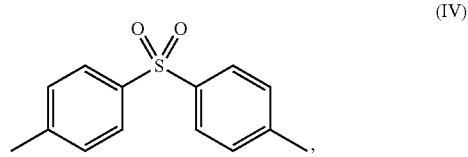

(IV)

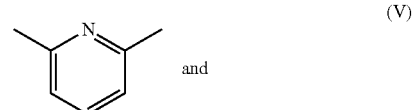

(V)

and

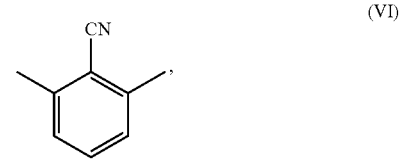

(VI)

wherein $R^2$ is selected from the group consisting of:

(VII)

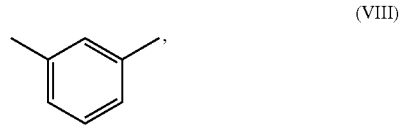

(VIII)

(IX)

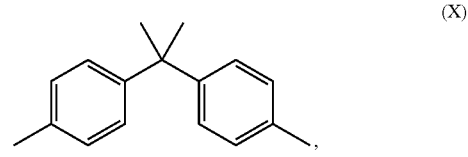

(X)

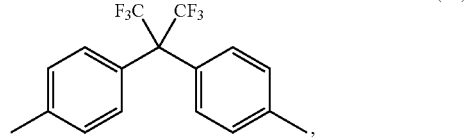

(XI)

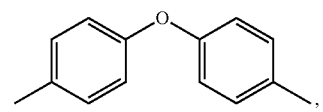
(XII)

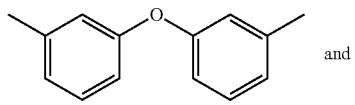
(XIII) and

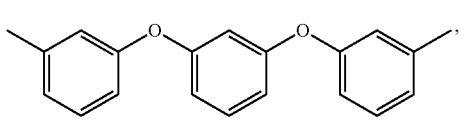
(XIV)

wherein R³ is selected from the group consisting of poly(arylacetylenes), poly(phenylethynyls),

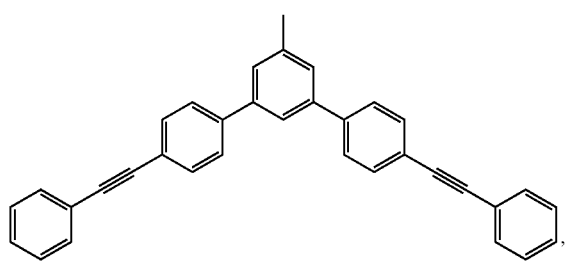
(XV)

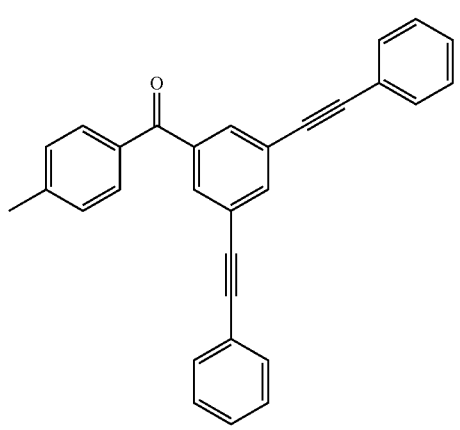
(XVI) and

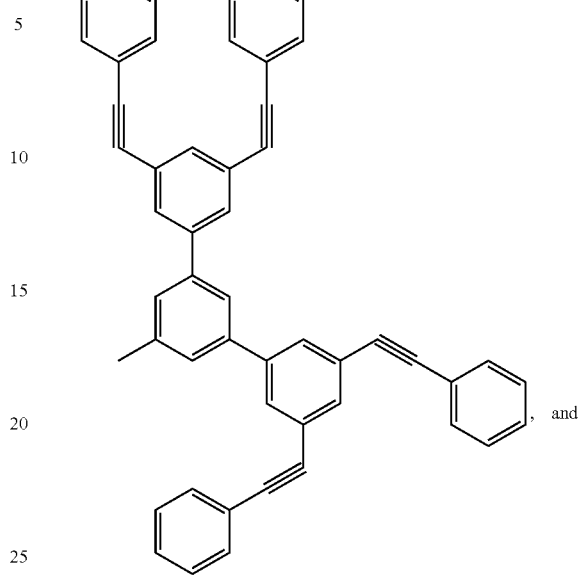
(XVII), and wherein n is a integer from about 5 to about 50.

In a first example, polyaryletherketone polymers according to embodiments of the present invention advantageously have a molecular weight between about 3,000 Daltons and about 10,000 Daltons. In a second example, polyaryletherketone polymers according to embodiments of the present invention advantageously have a molecular weight between about 4,000 Daltons and about 5,000 Daltons.

Figure 3:
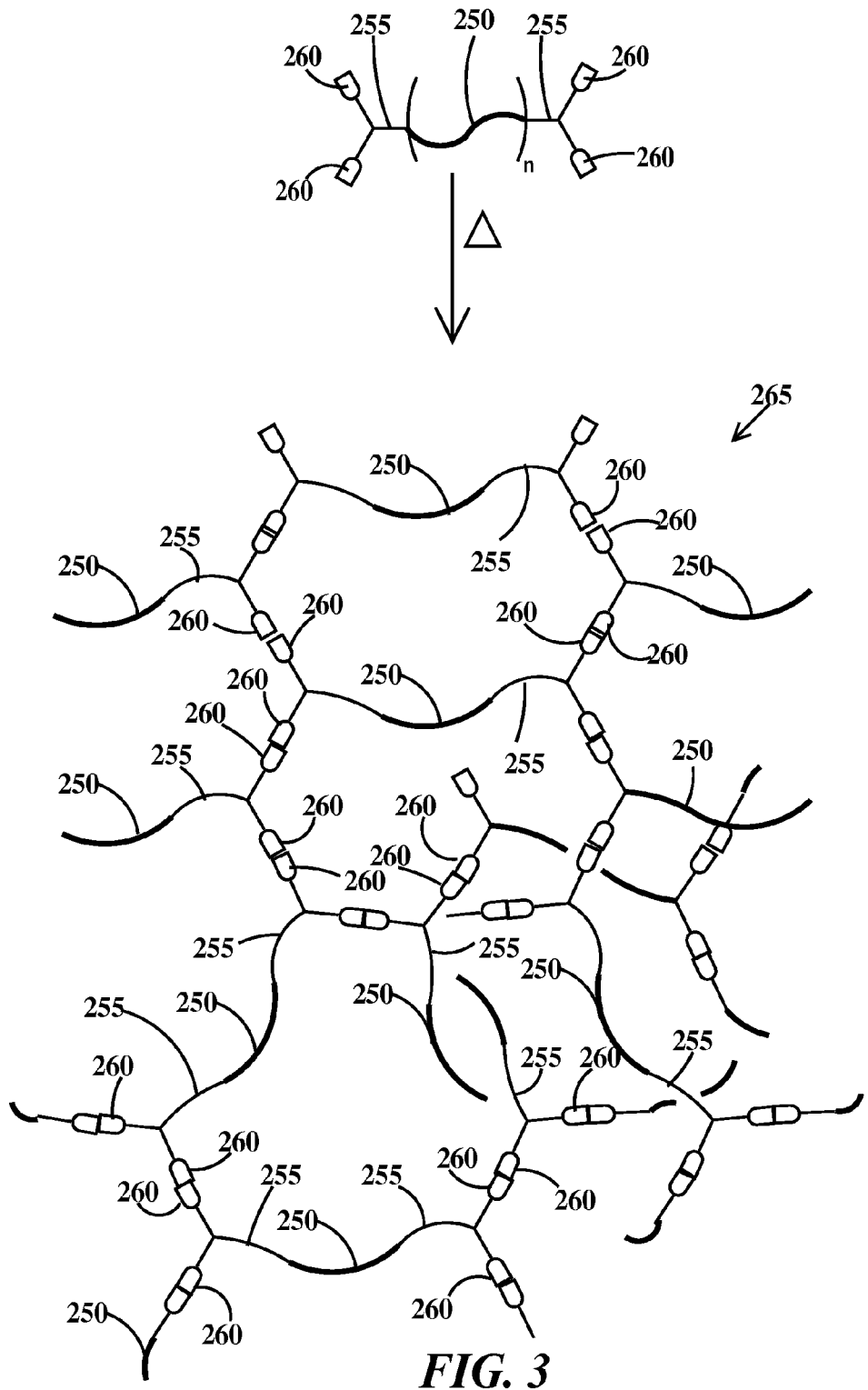
FIG. 3 is a diagram illustrating formation of a cured polyaryletherketone resin by cross-linking of reactive endgroups of a polyaryletherketone polymer according to embodiments of the present invention.

The endgroups R³ react during thermal curing with each other to cross-link the polyaryletherketone polymers into a polyaryletherketone resin by cyclo-addition. Note endgroups (XV) and (XVI) are examples of an endgroup having two phenylethynyl linkages that provide two cross-linking sites (as illustrated in FIG. 3). Endgroup (XVII) is an example of a reactive endgroup having four phenylethynyl linkages that provides four cross-linking sites. Other phenylethynyl containing endgroups having two or more phenylethynyl moieties may be substituted for endgroups (XIV), (XVI) and (XVII).

FIG. 3 is a diagram illustrating formation of a cured polyaryletherketone resin by cross-linking of reactive endgroups of a polyaryletherketone polymer according to embodiments of the present invention. In FIG. 3, a straight chain polyaryletherketone polymer 250 of repeating units n and having two endgroups 255, each having two phenylethynyl moieties 260 is heat cured to produce a cross-linked polyaryletherketone resin 265. In polyaryletherketone resin 265, polyaryletherketone polymers 250 are linked to each other through respective phenylethynyl moieties 260 of reactive endgroups 255. Cross-linking of polyaryletherketone polymers 250 in polyaryletherketone resin 265 is by cyclo-addition of the phenylethynyl moieties 260.

In FIG. 3, only cross-linking of two phenylethynyl groups on the ends of two different polymer has been illustrated. It should be understood that three or more phenylethynyl groups, each on a end of a different polymer, can react by cascading cyclo-addition so that three or more polymer ends are cross-linked at a single point.

SYNTHESIS EXAMPLES

All materials were purchased from Aldrich and used without further purification unless otherwise noted.

Synthesis of the reactive endgroup
3,5-bis(4-(phenylethynyl)phenyl)phenol (Structure XV)

(i) Synthesis of 4-(phenylethynyl)-1-bromobenzene (*JACS*, 2004, 126, 4540): 1-Bromo-4-iodobenzene (20.0 g, 70.7 mmol), bis(triphenylphospine)palladium(II) dichloride ($PdCl_2(PPh_3)_2$) (250 mg), and CuI (68 mg) were suspended in 50 mL triethylamine ($NEt_3$) and 100 mL tetrahydrofuran (THF). The suspension was treated with 3 cycles of evacuation and refilling with $N_2$. Phenylacetylene (7.21 g, 7.75 mL, 1.0 eq) was added in 0.5 mL portions every 5 minutes to the stirred suspension. The solution was then stirred at room temperature for 22 hours. The solvents were then evaporated. Methylene chloride (100 mL) and 1 M HCl (aqueous) (50 mL) were added, the organic layer was retained, and then was washed again with 1 M HCl (aqueous) (50 mL) and 2×50 mL water, dried ($MgSO_4$), filtered, and the solvent evaporated in vacuum to give 18 g of the title compound as a yellow solid, which was used without further purification.

(ii) Synthesis of 4-(phenylethynyl)phenyl boronic acid (*JACS*, 2004, 126, 5798): In a flame-dried flask, 4-(phenylethynyl)-1-bromobenzene (15.0 g, 58.4 mmol) was dissolved in dry THF (225 mL). The solution was treated with 3 cycles of evacuation and refilling with $N_2$, then chilled to −78° C. in a dry ice/acetone bath. To the stirred solution was added a solution of n-butyllithium in hexanes (1.6 M, 40 mL, 1.1 eq) by syringe over the course of 10 minutes. The resulting solution was stirred for an additional 30 minutes before trimethylborate (9.77 mL, 9.1 g, 1.5 eq) was added slowly over 15 minutes. After stirring for an additional 15 minutes, the cooling bath was removed and the solution was allowed to warm to room temperature and stir for 16 h. At this time, 2 M HCl (aqueous) (375 mL) was added, and the biphasic system was stirred vigorously for 2 hours. Ethyl acetate was added, and the organic layer was separated, dried ($MgSO_4$), filtered and evaporated. Methylene chloride (100 mL) was added to the solid residue, which was crushed and mixed into a paste, then filtered and washed with additional portions of methylene chloride to give 8.5 g of the title compound as a white powder.

(iii) Synthesis of 3,5-bis(4-(phenylethynyl)phenyl)phenol: 4-(Phenylethynyl)phenyl boronic acid (4.65 g, 20.9 mmol) was dissolved in 100 mL of toluene/ethanol (4:1 (v/v)), 3,5-dibromophenol (2.52 g, 10 mmol) was added, and then 20 mL of 2 M $Na_2CO_3$ (aqueous) was added. The resulting mixture was treated with 3 cycles of evacuation and refilling with $N_2$. Solid tetrakis(triphenylphospine)palladium(II) ($Pd(PPh_3)_4$) (232 mg) was then added, followed by 3 more cycles of evacuation and refilling with $N_2$. The reaction mixture was then heated to 85° C. in an oil bath for 5 hours. The reaction was cooled, and water (100 mL) and methylene chloride (100 mL) were added. The organic layer was separated, washed with water (50 mL), then dried ($MgSO_4$), filtered, and evaporated. The crude product was purified by column chromatography (silica, $CH_2Cl_2$) or alternately by trituration with $CH_2Cl_2$ followed by filtration to give in either case about 2.5 g of the title compound as a white solid. Example synthesis of a polyaryletherketone polymer (Structure XVIII):

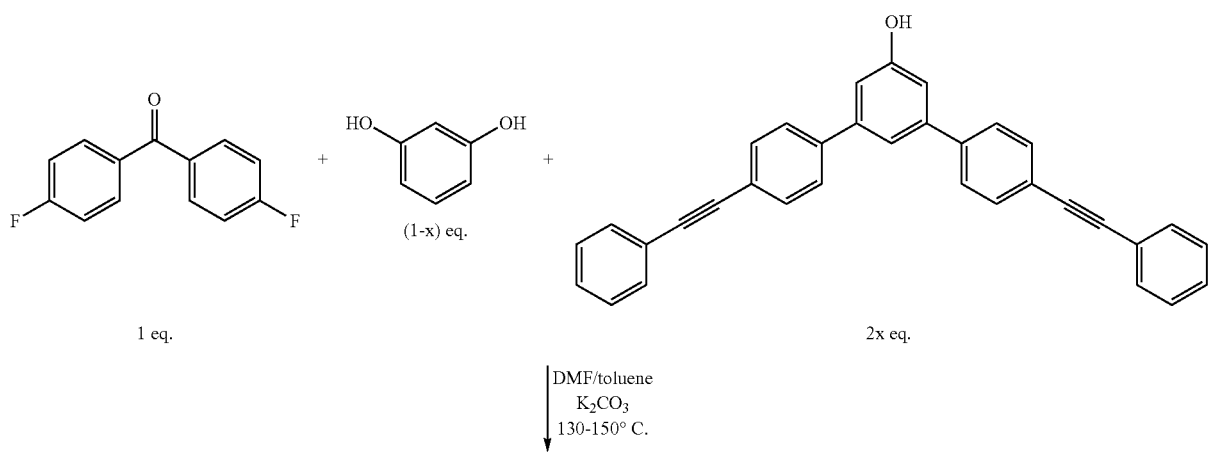

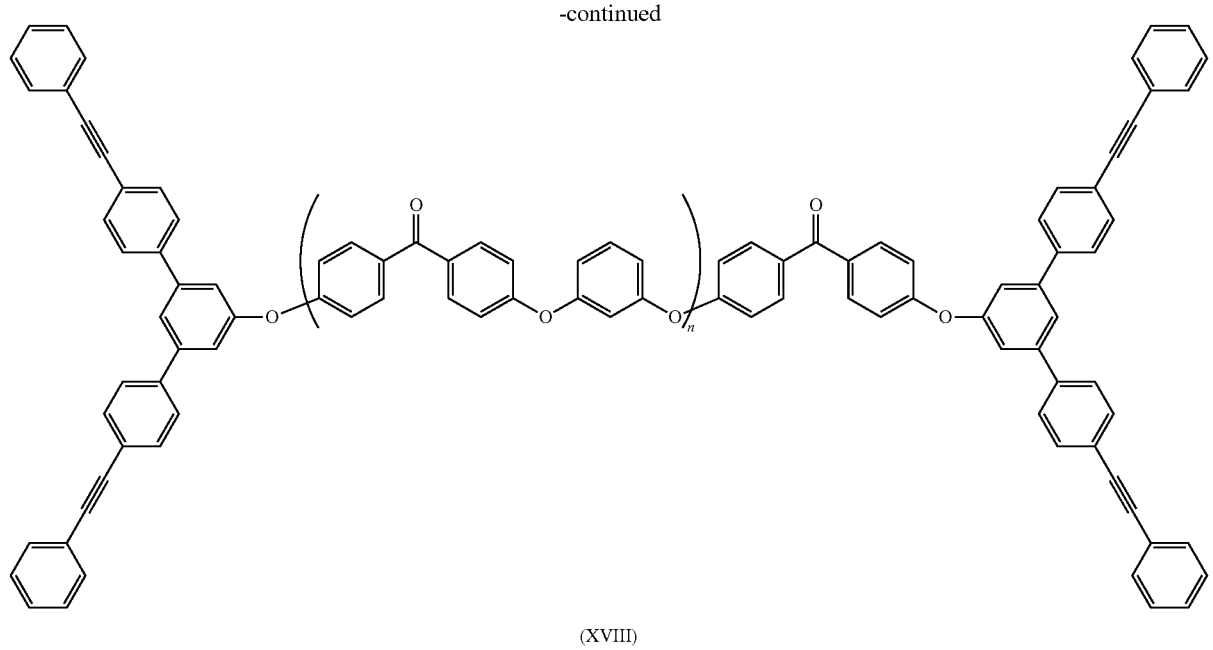

(XVIII)

In a multi-necked flask equipped with a mechanical stirring apparatus and a Dean-Stark trap, 4,4'-difluorobenzophenone (1.4187 g, 6.502 mmol), resorcinol (0.6658 g, 6.047 mmol), 3,5-bis(4-(phenylethynyl)phenyl)phenol (403.1 mg, 0.9037 mmol), and potassium carbonate (3 g, 22 mmol) were suspended in a mixture of DMF (10 mL) and toluene (20 mL). The reaction mixture was vigorously stirred and heated to 130° C. for 16 hours under a slow flow of dry nitrogen, and toluene was removed periodically via the Dean-Stark trap. At the end of the 16 hour period, the temperature was increased to 150° C. for another 8 hours. The reaction was then cooled and the polymer was isolated by multiple precipitations using THF and methanol. Molecular weights were adjusted by using different proportions of monomers and endcaps and several different molecular weight polymers were prepared.

Thus, the embodiments of the present invention provide for compositions of matter for the storage media that operate in the nanometer regime.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:
1. A composition of matter, comprising:
a polyaryletherketone copolymer, said polyaryletherketone polymer having two terminal ends, each terminal end having two or more phenylethynyl moieties, repeat units of said polyaryletherketone copolymer backbone containing ketone groups; and
wherein said polyaryletherketone copolymer has the structure:

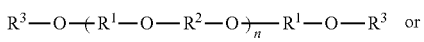

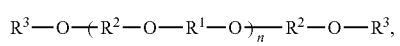

wherein $R^1$ is

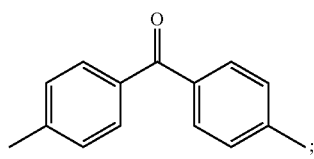

wherein $R^2$ is selected from the group consisting of

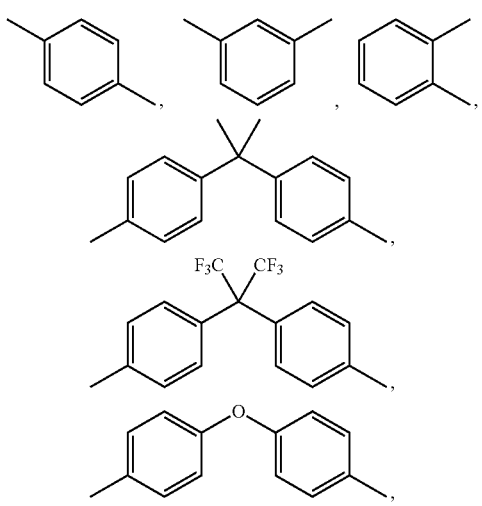

-continued

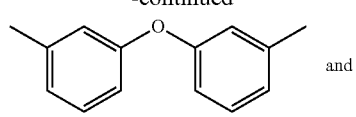
and

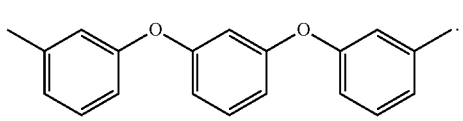
;

wherein R³ is selected from the group consisting of

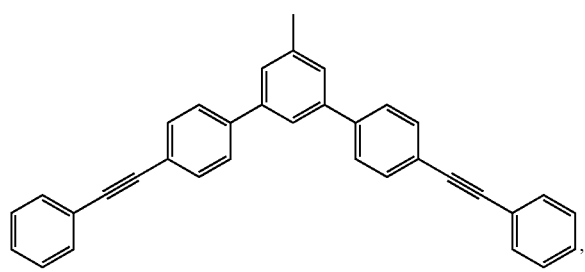
,

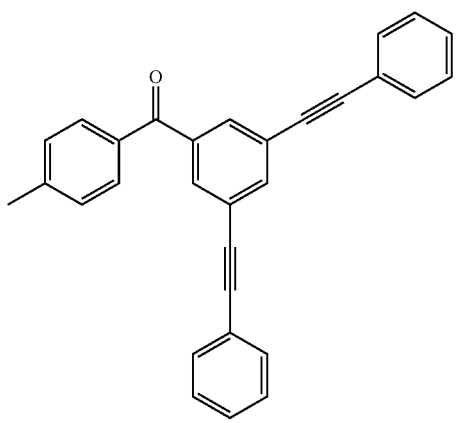
and

-continued

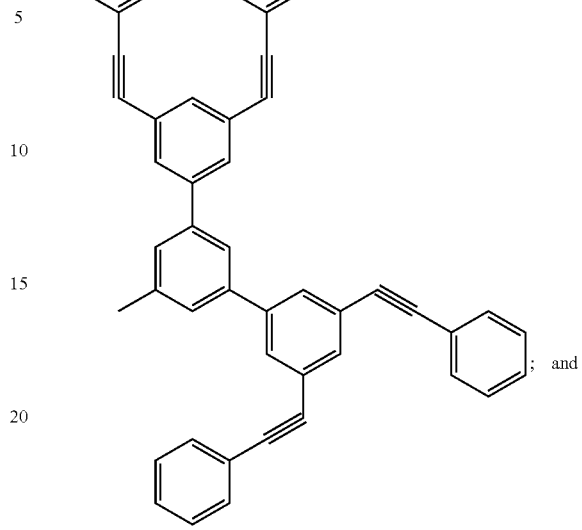
; and wherein n is an integer from 5 to 50.

2. The composition of matter of claim 1, wherein said polyaryletherketone copolymer has a molecular weight between 3,000 Daltons and 10,000 Daltons.

3. The composition of matter of claim 1, wherein said polyaryletherketone copolymer has a molecular weight between 4,000 Daltons and 5,000 Daltons.

4. A method, comprising cross-linking the polyaryletherketone copolymer of claim 1 by cyclo-addition reactions of said phenylethynyl moieties to form a polyaryletherketone resin.

5. The method of claim 4, wherein said polyaryletherketone resin has a glass transition temperature of between 100° C. and 180° C.

6. The method of claim 4, wherein said polyaryletherketone resin has a glass transition temperature of less than 180° C.

7. The method of claim 4, wherein said polyaryletherketone copolymer has a molecular weight between 3,000 Daltons and 10,000 Daltons.

8. The composition of matter of claim 1, wherein said polyaryletherketone copolymer has a molecular weight between 4,000 Daltons and 5,000 Daltons.

9. A composition of matter, comprising:
a copolymer having the structure:

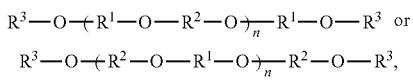

wherein R¹ is selected from the group consisting of

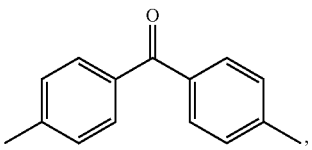
,

-continued

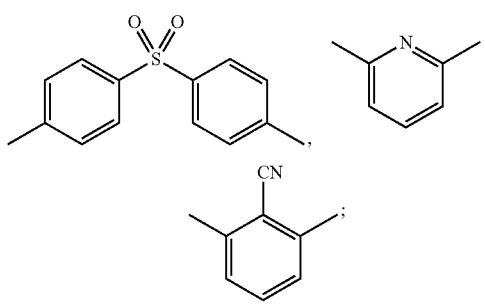

wherein R² is selected from the group consisting of

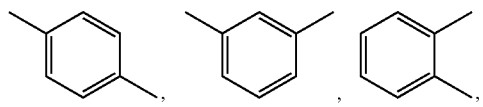

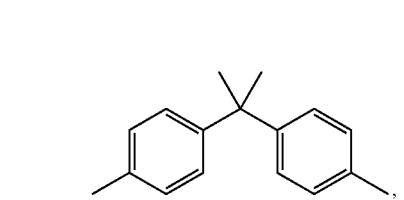

wherein R³ is selected from the group consisting of

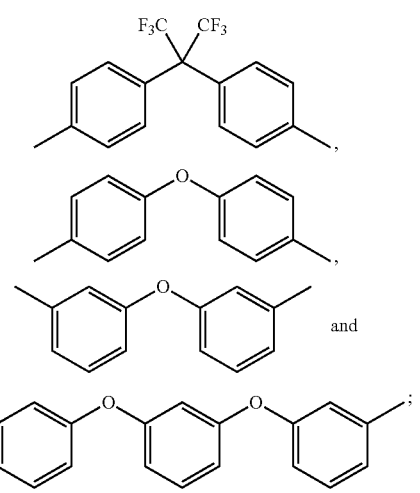

-continued

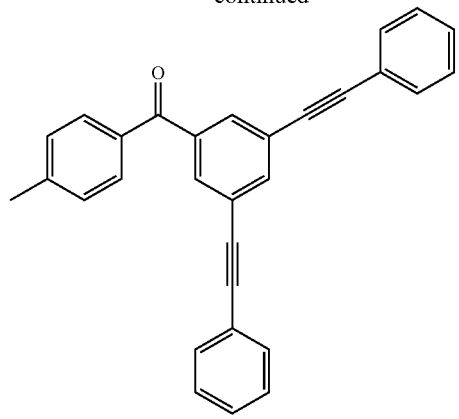

and

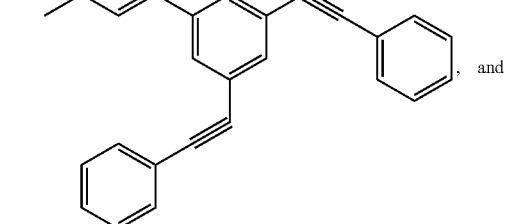

, and

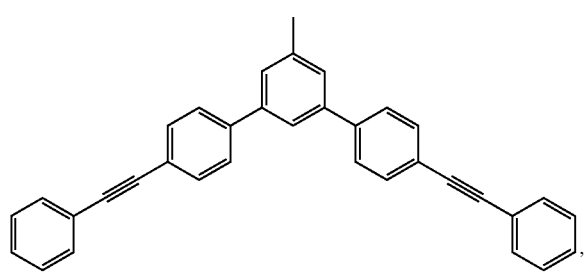

wherein n is an integer from 5 to 50.

10. The composition of matter of claim 9, wherein said copolymer has a molecular weight between 3,000 Daltons and 10,000 Daltons.

11. The composition of matter of claim 9, wherein said copolymer has a molecular weight between 4,000 Daltons and 5,000 Daltons.

12. A method, comprising cross-linking the copolymer of claim 9 by cyclo-addition reactions of said phenylethynyl moieties to form a resin.

13. The method of claim 12, wherein said resin has a glass transition temperature of between 100° C. and 180° C.

14. The method of claim 12, wherein said resin has a glass transition temperature of less than 180° C.

15. A composition of matter, comprising:
a polyaryletherketone copolymer having the structure:

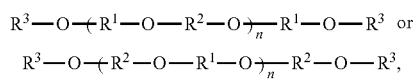

wherein R¹ is

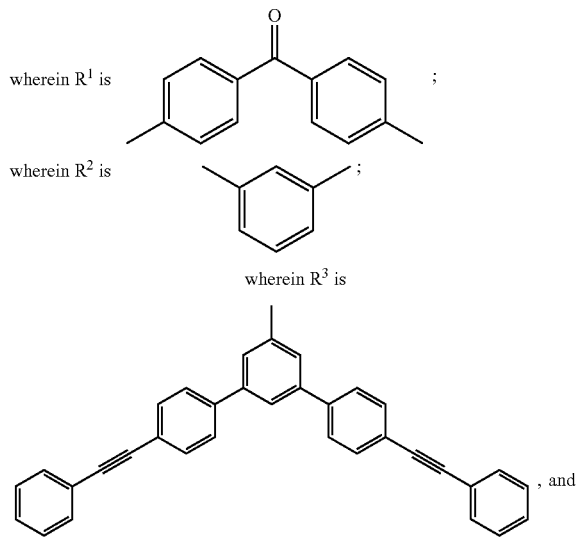

;

wherein R² is

;

wherein R³ is

, and wherein n is an integer from 5 to 50.

16. A method, comprising cross-linking the polyaryletherketone copolymer of claim 15 by cyclo-addition reactions of said phenylethynyl moieties to form a resin, said resin having a glass transition temperature of between 100° C. and 180° C.

17. A method, for use with a layer of polyaryletherketone resin on a substrate, said layer of polyaryletherketone resin formed from said composition of matter of claim 1, said polyaryletherketone resin thermally cross-linked by cyclo-addition reactions of said phenylethynyl moieties of said polyaryletherketone copolymer, said method comprising:

heating and bringing a thermo-mechanical device into contact with said layer of polyaryletherketone resin to write information into said layer of polyaryletherketone resin.

18. The method of claim 17, further including:

bringing said thermo-mechanical device, when unheated, into proximity with said layer of polyaryletherketone resin to read information stored in said layer of polyaryletherketone resin.

19. The method of claim 17, further including:

heating and bringing said thermo-mechanical device into proximity with said layer of polyaryletherketone resin to erase information from said layer of polyaryletherketone resin.

20. A method, for use with a layer of polyaryletherketone resin on a substrate, said layer of polyaryletherketone resin formed from said composition of matter of claim 1, said polyaryletherketone resin thermally cross-linked by cyclo-addition reactions of said phenylethynyl moieties of said polyaryletherketone copolymer, the method comprising:

bringing a thermal-mechanical probe heated to a temperature of greater than about 100° C. into proximity with said layer of polyaryletherketone resin multiple times to induce deformed regions at points in said layer of polyaryletherketone resin, resulting in information being written into said layer of polyaryletherketone resin.

21. The method of claim 20, further including:

bringing said thermal-mechanical probe into proximity with one or more of said deformed regions to read information previously written in said layer of polyaryletherketone resin.

22. The method of claim 20, further including:

bringing said thermal-mechanical probe into proximity with one or more of said deformed regions in said layer of polyaryletherketone resin, said thermal mechanical point heated to a temperature of greater than about 100° C.; and said thermo-mechanical probe heating said one or more deformed regions, resulting in deforming said one or more deformed regions in such a way as to eliminate said one or more deformed regions, resulting in erasing information previously written in said layer of polyaryletherketone resin.

* * * * *